US005671770A

United States Patent [19]

Rusche et al.

[11] Patent Number: 5,671,770

[45] Date of Patent: Sep. 30, 1997

[54] ASSEMBLY FOR PROVIDING A PASSAGE FOR LIQUID BETWEEN A FIRST MEMBER AND A SECOND MEMBER

[75] Inventors: Emil Herman Rusche, Nieuwegein; Jan Cornelis Van Hattem, Amerongen; Christoffel Anthonius Johannes Vroonland, Soesterberg, all of Netherlands

[73] Assignee: Sara Lee/De N.V., Utrecht, Netherlands

[21] Appl. No.: 520,264

[22] Filed: Aug. 28, 1995

[30] Foreign Application Priority Data

Aug. 30, 1994 [NL] Netherlands ............................ 9401399

[51] Int. Cl.[6] ...................................................... F16K 51/00

[52] U.S. Cl. ............................ 137/318; 222/91; 83/946; 408/204; 408/72 B; 408/241 B

[58] Field of Search ............................ 137/318; 222/91; 221/30, 31; 220/267, 277; 83/946, 30; 408/204, 72 B, 241 B

[56] References Cited

U.S. PATENT DOCUMENTS

| | | | |
|---|---|---|---|
| 2,712,886 | 7/1955 | Young | 222/91 |
| 4,128,107 | 12/1978 | Blumhardt | 137/318 |
| 4,483,464 | 11/1984 | Nomura . | |
| 4,712,714 | 12/1987 | Mucciarone | 222/91 |
| 4,723,687 | 2/1988 | Kutterer | 222/91 |
| 4,723,689 | 2/1988 | Vallos | 222/91 |
| 5,005,732 | 4/1991 | Penn | 222/91 |
| 5,105,844 | 4/1992 | King, Sr. | 137/318 |
| 5,201,193 | 4/1993 | Sundhar | 222/91 |
| 5,228,592 | 7/1993 | Pellerano | 222/91 |
| 5,337,775 | 8/1994 | Lane et al. | 137/318 |

FOREIGN PATENT DOCUMENTS

| | | |
|---|---|---|
| 526182 | 10/1979 | Australia . |
| 2243869 | 4/1975 | France . |
| 2528806 | 12/1983 | France . |
| 2134087 | 8/1984 | United Kingdom . |
| WO 94/01360 | 1/1994 | WIPO . |

*Primary Examiner*—Denise L. Ferensic
*Assistant Examiner*—Ramyar M. Farid
*Attorney, Agent, or Firm*—Merchant, Gould, Smith, Edell, Welter & Schmidt, P.A.

[57] ABSTRACT

An assembly, for providing a passage for liquid between a first member comprising a liquid reservoir such as a concentrate container or storage vessel and a second member such as a liquid outlet, includes a first connector which is adapted to be mounted on the second member and comprises a piercing assembly by which an opening can be provided in the first member, and a second connector which is undetachably connected to the first member. While in use, the first and second connectors are connected to each other, and the first connector is moved relative to the second connector in such a manner that the piercing assembly forces an opening in the first member, whereby the passage is effected.

10 Claims, 2 Drawing Sheets

ASSEMBLY FOR PROVIDING A PASSAGE FOR LIQUID BETWEEN A FIRST MEMBER AND A SECOND MEMBER

This invention relates to an assembly for providing a passage for liquid between a first member such as a concentrate container or storage vessel and a second member such as a liquid outlet, the assembly comprising a first connector which is adapted to be mounted on the second member and comprises piercing means by means of which an opening can be provided in the first member.

When being delivered, the storage vessel is often closed and not opened until the first connector is connected to the storage vessel. The storage vessel can be designed as a box accommodating a flexible bag filled with liquid.

Such an assembly is known from International patent application WO 94/01360. This assembly further comprises a third connector (also designated 'boss'), which is fixedly, i.e. undetachably, connected with the first member. The assembly according to the International patent application thus comprises three loose cylindrically shaped connectors which in use can be connected with each other. More particularly, the second connector is first slid partly into the third connector, whereby a snap-fit connection is effected. Then the first connector is brought into the second connector, with the first and second connectors being telescopically movable relative to each other. By then moving the first connector further into the second connector in the direction of the first member and in such a manner that the third connector also comprises the first connector, the piercing means touch the first member and a passage can be forced therein.

A problem with such an assembly is that, given a standard size of the third connector, the effective diameter of the passage for liquid formed by the assembly is relatively small. This diameter is defined by the inner wall of the first connector and is limited by the fact that the first connector is to be slid into the second connector, while the second connector is to be slid into the third connector.

The invention provides a solution to the problem outlined above and is characterized in that the assembly further comprises a second connector which is undetachably connected with the first member, while in use the first and second connectors are connected with each other and the first connector is moved relative to the second connector in such a manner that the piercing means force an opening in the first member, whereby the passage referred to is effected.

Because the assembly according to the invention comprises only two rather than three connectors, the diameter of an inner wall of the first connector can be made greater than the diameter of the above-described known inner wall.

In particular, the second connector to that end comprises a passageway extending to the first member, which passageway accommodates in use at least a connecting portion of the first connector. Preferably, at least the connecting portion of the first connector is of tubular design.

According to a preferred embodiment of the invention, the first connector comprises on the outside thereof self-tapping screw thread, which in use cooperates with the inner wall of the passageway. More particularly, the first connector comprises multiple screw thread. This last has as an advantage that the first connector, if it is screwed out of alignment into the second connector, will tend to pull itself straight. Moreover, the multiple screw thread has a good grip on the inner wall of the second connector directly upon initiation of screwing in. Further, by means of a multiple screw thread it is possible to realize a large pitch, so that a slight turn results in a displacement over a relatively large distance.

According to a particularly advantageous embodiment, the screw thread is so designed that the forcing of an opening in the first member can be effected by turning the first connector relative to the second connector through an angle of less than 360 degrees. This prevents the possibility that a part of the wall of the first member in which an opening is being forced is detached completely from the remainder of the wall. If this were to occur, this would entail the risk that the detached part of the wall is entrained by the liquid flow and, for instance, becomes available for consumption.

In particular, a free end of the connecting portion comprises at least one tooth forming the piercing means and extending in axial direction of the connecting portion.

According to a particular embodiment of the assembly, the free end comprises more teeth, the points of at least two teeth being staggered relative to each other in axial direction. According to this exemplary embodiment, the chances of a part of the wall of the first member becoming completely detached are further reduced.

According to another advantageous aspect of the invention, the points of at least two V-shaped recesses formed between two teeth are staggered relative to each other in axial direction. This has as an advantage that a good, i.e. complete, drain of the first member can take place through the largest recess.

According to a further perfection of the assembly according to the invention, at least one tooth comprises adjacent its point a thickening extending radially outwards, with the inner wall of the passageway comprising a groove extending in axial direction. If an unauthorized person attempts to screw the first connector out of the second connector, the thickening will hook in the groove so that the first connector cannot be removed.

According to another important aspect of the invention, the connecting portion comprises an O-shaped sealing ring whose outer diameter is greater than the inner diameter of the passageway. When the first connector is screwed into the second connector, this ring provides a perfect seal for liquid. Also when the second connector has a somewhat pockmarked surface, a good seal between the two connectors is obtained.

In particular, the sealing ring is located at some distance from the screw thread. According to an advantageous embodiment, the sealing ring is partly countersunk in a groove extending along the perimeter of the connecting portion.

Surprisingly, it has been found that with such a construction a particularly good seal is obtained. Moreover, the groove has as an advantage that the ring is located in the proper position at all times and cannot be dislodged.

According to a particular embodiment of the invention, the outer diameter of the connecting portion is less than the outer diameter of a continuation portion of the first connector, which adjoins the connecting portion. As a result, an edge is formed which provides that the first connector can be screwed into the second connector over a correct distance and to that end functions as a stop shoulder. On the other hand, it can be simply arranged for the inner diameter of the connecting portion to be less than the inner diameter of the continuation portion. This has as an advantage that into the portion having the wider inner diameter, a portion of an extended connector can be introduced, in which a particular device such as for instance a dosing device may be accommodated.

According to a highly advanced embodiment of the invention, the sealing ring is located adjacent the transition from the connecting portion to the continuation portion. As a result, the sealing ring is clamped between the second connector and the annular edge formed by the connecting portion when the first connector is connected to the second connector, so that a particularly secure seal is obtained.

In particular, the passageway comprises near its free end a radially outwardly extending inner wall merging into an outer rim of the second connector. Such an inner wall provides a space in which the sealing ring can at least partly be accommodated for obtaining an even better seal.

The invention also relates to a first connector and a second connector suitable for use in an assembly as described hereinabove.

The invention will be further explained with reference to the drawings. In the drawings.

Figure 1:
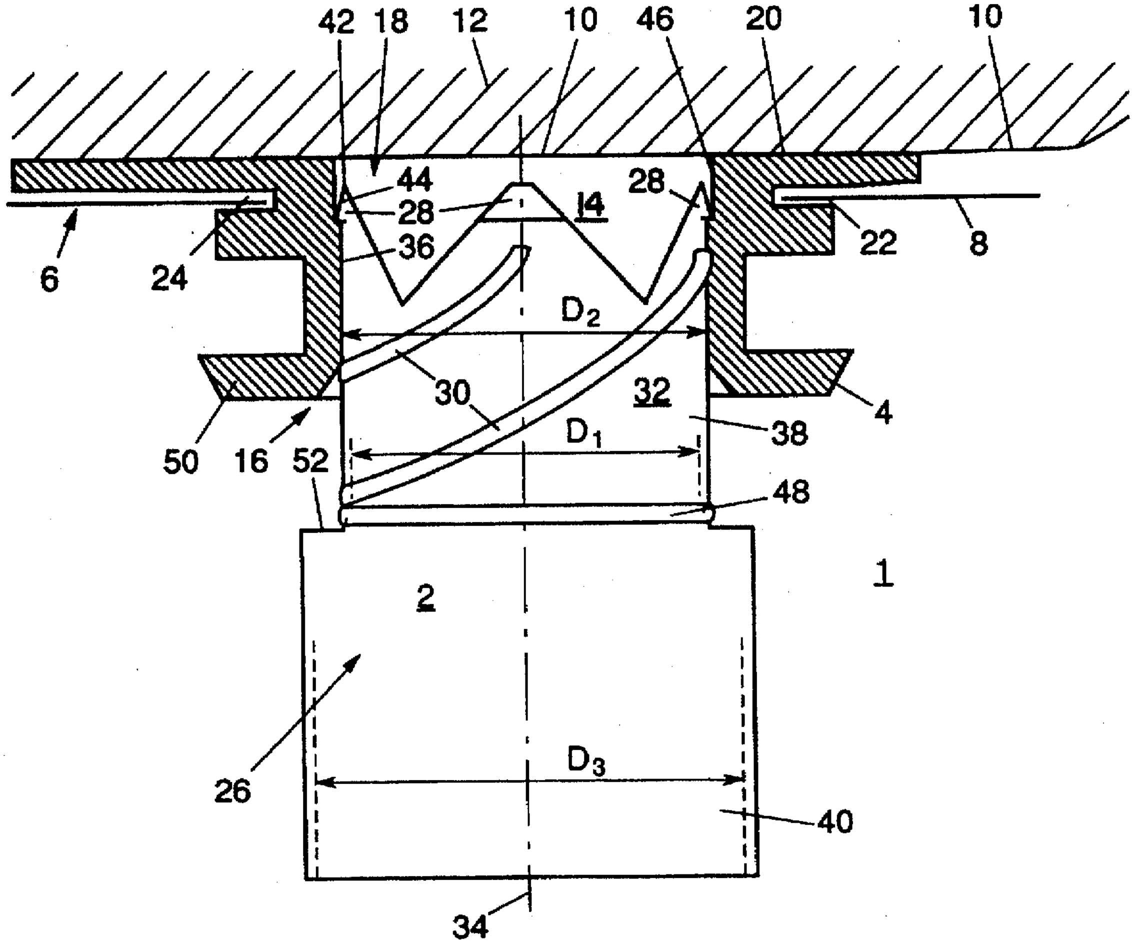
FIG. 1 shows a cross section of a first exemplary embodiment of an assembly according to the invention.
Figure 2:
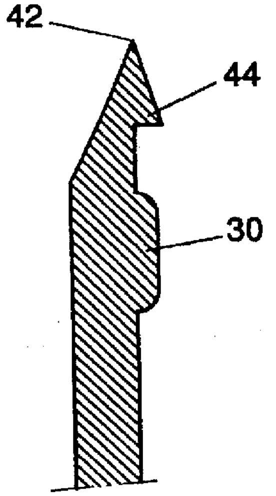
FIG. 2 shows a detail of FIG. 1.

In FIG. 1 reference numeral 1 designates an exemplary embodiment of an assembly according to the invention. The assembly 1 consists of a first connector 2 and a second connector cooperating therewith. The second connector is cylindrically shaped. The second connector is fixedly connected with a first member 6. In this example, the first member 6 consists of a box 8 in which a liquid-filled bag 10 is accommodated. In the drawing the liquid 12 is indicated by hatching. In this example, the cylindrically shaped second connector 4 comprises a likewise cylindrically shaped pasasageway 14 with a first, open end 16 and a second end 18. A flat underside 20 of the second connector 4 is attached to the outside of the bag 10. This joint can for instance have been effected by gluing and in any case has the property that the bag 10 and the underside 20 are liquid-impermeably connected with each other. The box 8 comprises an opening 22 through which extends the second connector 4. For keeping the second connector 4 in position relative to the box 8, the second connector comprises on the outer circumferential wall thereof a groove 24 in which a part of the box 8 is received. It is noted that prior to use the bag 10 keeps the passageway 14 closed off from the liquid 12. If it is desired to provide a passage for the liquid 12 from the first member to a second member, not shown here, such as for instance a liquid outlet, use is made of the first connector 2. The first connector 2 is likewise of tubular design and comprises a cylindrical passageway 26 extending in the longitudinal direction of the first connector. The first connector 2 further comprises piercing means in the form of teeth 28 which are situated on an edge of the tubular first connector.

The first connector further comprises a self-tapping screw thread 30 which extends around the outer wall 32 of the first connector. In this particular case, the first connector comprises a multiple screw thread.

In use the first connector is introduced into the passageway 14 of the second connector. Then the first connector is turned about its longitudinal axis 34, whereby, as a result of a cooperation between the screw thread 30 and an inner wall 36 of the second connector 4, the first connector 2 will move in the direction of the bag 10. Upon continued rotation, the teeth 28 will touch the bag 10 near the open end 18 to subsequently force an opening in the bag 10.

By virtue of the first connector being connected directly, i.e. without the intermediacy of a third connector, to the second connector, it has been made possible for the smallest inner diameter D1 of the first connector to be only slightly smaller than the smallest inner diameter D2 of the second connector 4.

In this example, the first connector 2 is made up of a connecting portion 38 having the inner diameter D1 and a continuation portion 40 adjoining the connecting portion, having an inner diameter D3 which is greater than the inner diameter D1. In the continuation portion, for instance a tubular infeed part of the second member can be received, by means of which a passage for liquid from the first member to the second member is effected.

In this example, the teeth comprise near their point 42 a radially outwardly projecting thickening 44. The inner wall 36 comprises a groove 46 near the passageway 14. The resultant effect is that the first connector 2 cannot easily be screwed out of the second connector 4 by anyone who is not authorized to do so. The thickening 44 will then be caught in the groove 46, so that the first connector cannot be removed.

Located adjacent the transition from the connecting portion 38 to the continuation portion 40 is a sealing ring 48. If the first connector is screwed completely into the second connector 4, whereby the teeth 28 will extend into the first member 6, the sealing ring 48 in cooperation with the second connector 4 will form a proper seal for liquid. In particular, the inner wall 36 bends radially outwards adjacent the passageway end 16, merging into an outer rim 50 of the second connector 4. This part of the inner wall 36 provides an eminently suitable accommodation space for the ring 48 which in cooperation with this part of the inner wall provides for a good sealing. To that end, the ring 48 is flexible in this example. Because in this example the outer diameter of the connecting portion is less than the outer diameter of the continuation portion, the assembly comprises an edge 52 which, in cooperation with the outer rim 50, defines over what distance the first connector can be screwed into the second connector.

Figure 3:
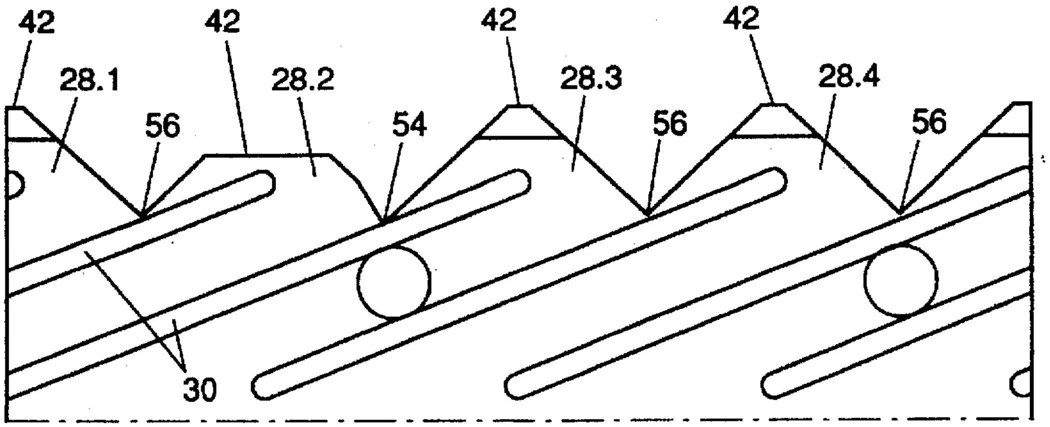
FIG. 3 shows a developed length of a part of the assembly according to FIG. 1.

A particularly advantageous aspect of the assembly of the invention will be further elucidated with reference to FIG. 3, showing a developed length of the end of the first connector 2 that comprises the teeth 28. In this example, the connector comprises four teeth 28.1, 28.2, 28.3 and 28.4. The point 42 of tooth 28.2 is staggered relative to the points of the other teeth 28.1, 28.3, and 28.4. More particularly, the tooth 28.2 comprises a more obtuse point than the other teeth. As a result of all this, the teeth 28.1, 28.3 and 28.4 will be the first to touch the bag 10 when the first connector 2 is screwed into the second connector 4. Accordingly, only these teeth will force an opening in the bag 10. Partly because the tooth 28.2 comprises an obtuse truncated end 42, this tooth will ensure that no wall portion of the bag is cut out completely. More particularly, the screw thread 30 has a pitch such that from the moment when the teeth 28.1, 28.3 and 28.4 engage the plastic bag 10, the first connector must be rotated through an angle of less than 360° to be screwed entirely into the second connector, with the edge 52 touching the circumferential rim 50 in the end position. Because, as a result, no round hole is cut out from the bag 10 through a full 360°, a partly cut-out wall portion will remain attached to the remainder of the bag at all times. The thread of the screw 30, in combination with the tooth 28.2, precludes the possibility of a part of the bag being cut out completely.

According to another aspect of the invention, a point 54 of a V-shaped recess formed between the teeth 28.2 and 28.3 is located in axial direction at a level staggered relative to points 56 of V-shaped recesses formed between other teeth. In this case the point 54 is located downstream of the other points 56. Thus a proper drain of the bag 10 is obtained. This last is enhanced in that in this example the point 42 of the tooth 28.2 is also located downstream relative to the corresponding points of the other teeth and moreover is located directly adjacent to the point 54 of the V-shaped recess.

Figure 4:
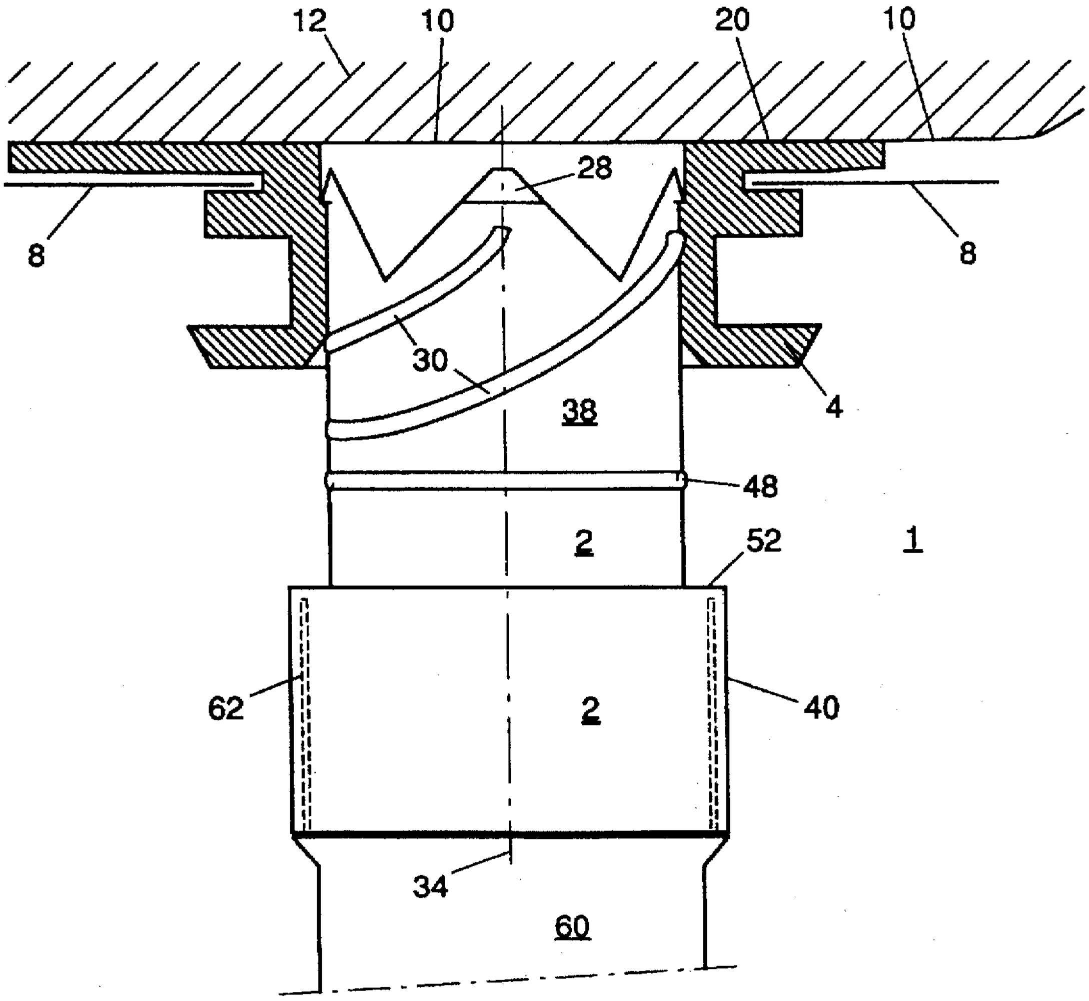
FIG. 4 shows a cross section of an alternative exemplary embodiment of an assembly according to the invention.

FIG. 4 shows an alternative embodiment of an assembly according to the invention. Here parts corresponding to the parts of FIG. 1 are provided with the same reference numerals. In this example, however, the ring 48 is located at a greater distance from the edge 52 than was the case in the assembly according to FIG. 1. For that matter, the ring 48 is located near the screw thread 30. The assembly according to FIG. 4 further comprises a unit 60, an end 62 of which is slid into the continuation portion 40. The unit 60 comprises a dosing unit, known per se, by means of which an accurately defined amount of liquid can be supplied from the first member 6 to a second member, not shown here, connected with the unit 60. Typically, the liquid is a concentrate of coffee, lemonade or any other beverage to be mixed with water to be rendered suitable for consumption. Because the liquid in question is highly concentrated, it is extremely important that the dosing unit 60 is capable of controlling the transport of amounts of such liquid in a highly accurate manner. Typically, the second member, not shown here, comprises means for mixing the concentrate with water and optionally heating it. Since this is an application which is known per se, it will not be further explained here. Finally, it is observed that the second connector need not be provided specifically with four teeth. It is also possible to use three, five or any other number of teeth. Also, a continuation portion 40 can be square or, for instance, hexagonal in cross section. In this example, the first member 6 consists of a box accommodating a liquid-filled bag 10. However, the first member can also consist of a cardboard box whose inner wall has been provided with a liquid-impermeable material, so that the bag 10 can be omitted. Then the second connector is undetachably connected to the cardboard wall of the box. In that case, therefore, the teeth 28 will force an opening in the cardboard wall of the box. These and other variant embodiments are all understood to fall within the scope of the present invention.

We claim:

1. An assembly for providing a passage for liquid between a first member comprising a liquid reservoir and a second member comprising a liquid outlet, the assembly comprising:

a first connector which is mounted on the second member and comprises piercing means by means of which an opening is provided in the first member, and a liquid passageway from the first member to the second member being defined in the first connector;

a second connector which is undetachably connected to the first member, while in use the first and second connectors are connected to each other and the first connector is moved relative to the second connector in such a manner that the piercing means force an opening in the first member, whereby said passage is effected;

the second connector comprising a passageway extending to the first member, in which passageway in use at least a connecting portion of the first connector is received, the connecting portion of the first connector being of tubular design;

the first connector comprising on an outer wall a self-tapping multiple screw thread, which in use cooperates with an inner wall of the second connector, wherein the screw thread is configured such that forcing an opening in the first member is effected by turning the first connector relative to the second connector through an angle of less than 360 degrees, so that no round hole is cut out from the first member resulting in a partly cut-out wall portion that remains attached to remainder of the first member; and wherein a free end of the connecting portion comprises a plurality of teeth forming the piercing means and laying on a circle with points of at least two of the plurality of teeth being staggered relative to each ether in the axial direction of the connecting portion.

2. As assembly according to claim 1 wherein points of at least two V-shaped recesses formed between two teeth are staggered relative to each other in the axial direction of the connecting portion.

3. As assembly according to claim 2, wherein at least one of the teeth comprises near its point a radially outwardly extending thickening, the inner wall of the second connector comprises a groove extending in the axial direction of the connecting portion.

4. As assembly according to claim 3, wherein the connecting portion comprises an O-shaped sealing ring whose outer diameter is greater than an inner diameter of the passageway of the second connector.

5. As assembly according to claim 4, wherein the sealing ring is partly countersunk in a groove extending along a perimeter of the connecting portion.

6. An assembly according to claim 5, wherein an outer diameter of the connecting portion is less than an outer diameter of a continuation portion, adjoining the connecting portion, of the first connector.

7. An assembly according to claim 6, wherein the inner diameter of the connecting portion is less than an inner diameter of the continuation portion.

8. An assembly according to claim 7, wherein the sealing ring is located adjacent a transition from the connecting portion to the continuation portion.

9. An assembly according to claim 8, wherein the passageway of the second connecting portion comprises near its free end a radially outwardly extending inner wall which merges into an outer rim of the second connector.

10. An assembly according to claim 9, wherein the first connector further comprises a liquid dosing device.

* * * * *